(12) United States Patent
Paulsen

(10) Patent No.: US 7,573,536 B2
(45) Date of Patent: Aug. 11, 2009

(54) METHOD FOR CONTROLLING A DEVICE FOR THE DISTRIBUTION AND PROCESSING OF VIDEO SIGNALS

(75) Inventor: Arnd Paulsen, Darmstadt (DE)

(73) Assignee: Thomson Licensing, Boulogne Billancourt (FR)

( * ) Notice: Subject to any disclaimer, the term of this patent is extended or adjusted under 35 U.S.C. 154(b) by 1226 days.

(21) Appl. No.: 10/805,717

(22) Filed: Mar. 22, 2004

(65) Prior Publication Data

US 2004/0252241 A1 Dec. 16, 2004

(30) Foreign Application Priority Data

Mar. 28, 2003 (DE) ................. 103 14 105

(51) Int. Cl.
*H04N 5/222* (2006.01)
*H04L 23/02* (2006.01)

(52) U.S. Cl. .............. 348/722; 348/705; 348/706; 348/659

(58) Field of Classification Search ............. 348/722, 348/705–706, 558, 14.11, 659–661, 569, 348/725; 345/168; 725/37, 93; *H04N 5/222; H04L 23/02*
See application file for complete search history.

(56) References Cited

U.S. PATENT DOCUMENTS

| | | | |
|---|---|---|---|
| 5,995,505 A | * | 11/1999 | Nakasaka et al. ........... 370/360 |
| 6,064,422 A | * | 5/2000 | Goolcharan et al. ....... 348/14.12 |
| 6,351,258 B1 | * | 2/2002 | Satoh ......................... 345/168 |
| 6,768,519 B2 | | 7/2004 | Fujita et al. |
| 6,985,189 B1 | * | 1/2006 | Takada et al. ............... 348/558 |
| 2002/0188772 A1 | * | 12/2002 | Radcliffe et al. .............. 710/38 |

FOREIGN PATENT DOCUMENTS

| | | |
|---|---|---|
| JP | 2001-211385 | 8/2001 |
| JP | 2002-325201 | 8/2002 |

\* cited by examiner

*Primary Examiner*—Trang U Tran
(74) *Attorney, Agent, or Firm*—Robert D. Shedd; Robert B. Levy

(57) ABSTRACT

A method for controlling a device for the distribution and processing of video signals is proposed. The device has a number of inputs and outputs. Signal processing stages for processing the input signals can optionally be switched into the signal paths. The method according to the invention comprises the following steps: input signals are represented on a display with an input symbol. When common properties are present, the relevant input sources are assigned input symbols which have a common color property and/or graphical property. The relations between a specific input symbol and the assigned input signal and the relevant input are stored. An output of the device is assigned an output symbol, which represents the desired properties of the output signal in the same way as the input symbols represent the properties of the input signals. Finally, an output symbol is assigned to an input symbol, whereupon the relevant input is connected to the relevant output.

15 Claims, 4 Drawing Sheets

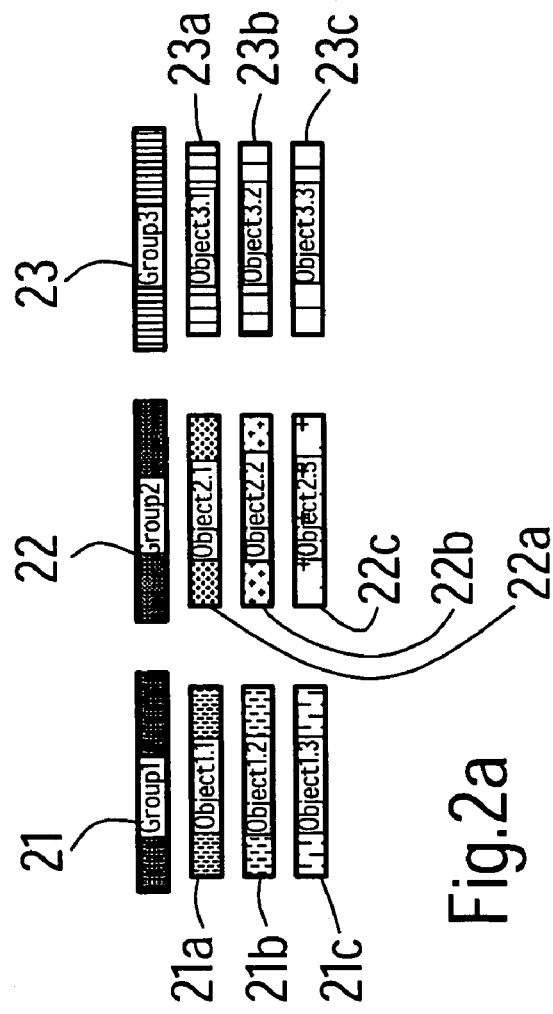
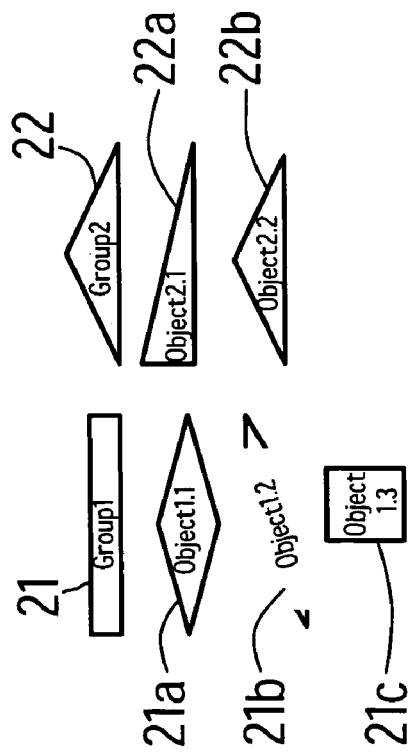
Fig.2a
Fig.2b

METHOD FOR CONTROLLING A DEVICE FOR THE DISTRIBUTION AND PROCESSING OF VIDEO SIGNALS

This application claims the benefit under 35 U.S.C. § 119 of German application number 10314105.7, filed Mar. 28, 2003.

FIELD OF THE INVENTION

The invention relates to a method for controlling a device for the distribution and processing of video signals. In particular, the invention relates to a device according to claim 1.

BACKGROUND OF THE INVENTION

Numerous video signal sources are available in television studios. Said signal sources include recording apparatuses, such as, for example, tape machines, cameras and also satellite or cable connections. In the production of a newscast, for example, different signal sources are often inter-connected to form a contribution. Typically, a newsreader in the studio is a guide through the broadcast, said newsreader being recorded by one or a plurality of cameras. The newsreader introduces previously recorded contributions or direct transmissions. By means of studio mixers, various video sources are mixed to form a broadcast picture and very often also supplemented by inserted text and configured with video effects. The output signal of the studio mixer is made available for transmission at a plurality of outputs. This includes transmission to a satellite, a cable network or terrestrial broadcasting installations, from where the broadcast is relayed to the viewers. Modern studio devices are nowadays able to make the video signals available simultaneously in different formats and different standards at various outputs. The selection of which signals are provided at which outputs is performed by an operator in the studio. Said operator's task is furthermore made more difficult by the fact that the incoming signal sources generally also have different formats. However, many input formats cannot be converted into every output format, so that it is not necessarily possible for every input signal to be forwarded to every output. This has to be taken into account by the operator in the connection and forwarding of signal sources.

To summarize, it must be emphasized that the activity of the operator also has technical aspects besides the creative aspect of mixing and configuring television pictures from various signal sources. Firstly, it is necessary to select the correct signal sources on the input side and forward them to the correct outputs. That alone is extremely difficult with more than two hundred inputs and two hundred outputs. Secondly, in this case, it is necessary at the same time to take account of the compatibility of the input signals with the output signals. For these reasons, the operator's work is very challenging.

Therefore, there is a need to provide a method which relieves the operator as far as possible of the burden of the abovementioned technical aspects in the course of his activity, in order that he can concentrate on the creative aspect of his work.

SUMMARY OF THE INVENTION

The method according to the invention serves for controlling a device for the distribution and processing of video signals. The device has a number of inputs and outputs. Signal processing stages for processing the input signals can optionally be switched into the signal paths. The method according to the invention comprises the following steps:

(a) input signals are represented on a display with an input symbol;
(b) given the presence of common properties, the relevant input signals are assigned input symbols which have a common color property and/or graphical property;
(c) the relations between a specific input symbol and the assigned input signal and the relevant input are stored;
(d) an output of the device is assigned an output symbol, which represents the desired properties of the output signal in the same way as the input symbols represent the properties of the input signals; and
(e) an output symbol is assigned to an input symbol, whereupon the relevant input is connected to the relevant output.

The invention makes it easier for an operator to control a device for the distribution and processing of video signals, because the method automatically executes many functions at the machine level.

In one embodiment of the invention, the input signals have predefined properties. The input symbols are assigned to the input signals in a manner dependent on the predefined properties.

However, it may also be provided that the input signals are analyzed with regard to their properties. In this case, the input symbols are assigned in a manner dependent on the ascertained properties of the input signals.

The properties of the input and/or output signals may advantageously be structured in groups, and the assigned input and/or output symbols are reflected by color and/or graphical commonalities. This enables and operator to identify signals having identical or similar properties at a glance.

In one exemplary embodiment of the invention, signal processing stages are switched into the signal path in order to convert the properties of the input signal into the properties of the output signal. This results in a high degree of flexibility of the device.

The connection of the signal path between an input and an output is expediently effected by the actuation of a crossbar.

The conversion of the properties of input signals may be effected by the actuation of signal converters.

In one refinement of the invention, the signal path. between an input and an output of the device is produced by the confirmation of a multiplexer and/or of a demultiplexer.

In one development of the invention, a check is made to determine whether the properties of an input signal can be converted into the desired properties of an output signal. If this is not possible, the assignment of the relevant input symbol to the relevant output symbol is not permitted. This feature affords the invention the advantage that instances of incorrect operation by the operator are practically precluded, as a result of which his work is made considerably easier.

In addition or as an alternative, it may also be provided that a check is made to determine whether the device is actually able, with regard to the available apparatus resources, to perform the desired signal conversion.

BRIEF DESCRIPTION OF THE DRAWINGS

The essential aspects of the method according to the invention are illustrated in the drawing, in which:

FIGS. 2a and 2b show the representation of objects on a display;

DETAILED DESCRIPTION OF PREFERRED EMBODIMENTS

Figure 1:
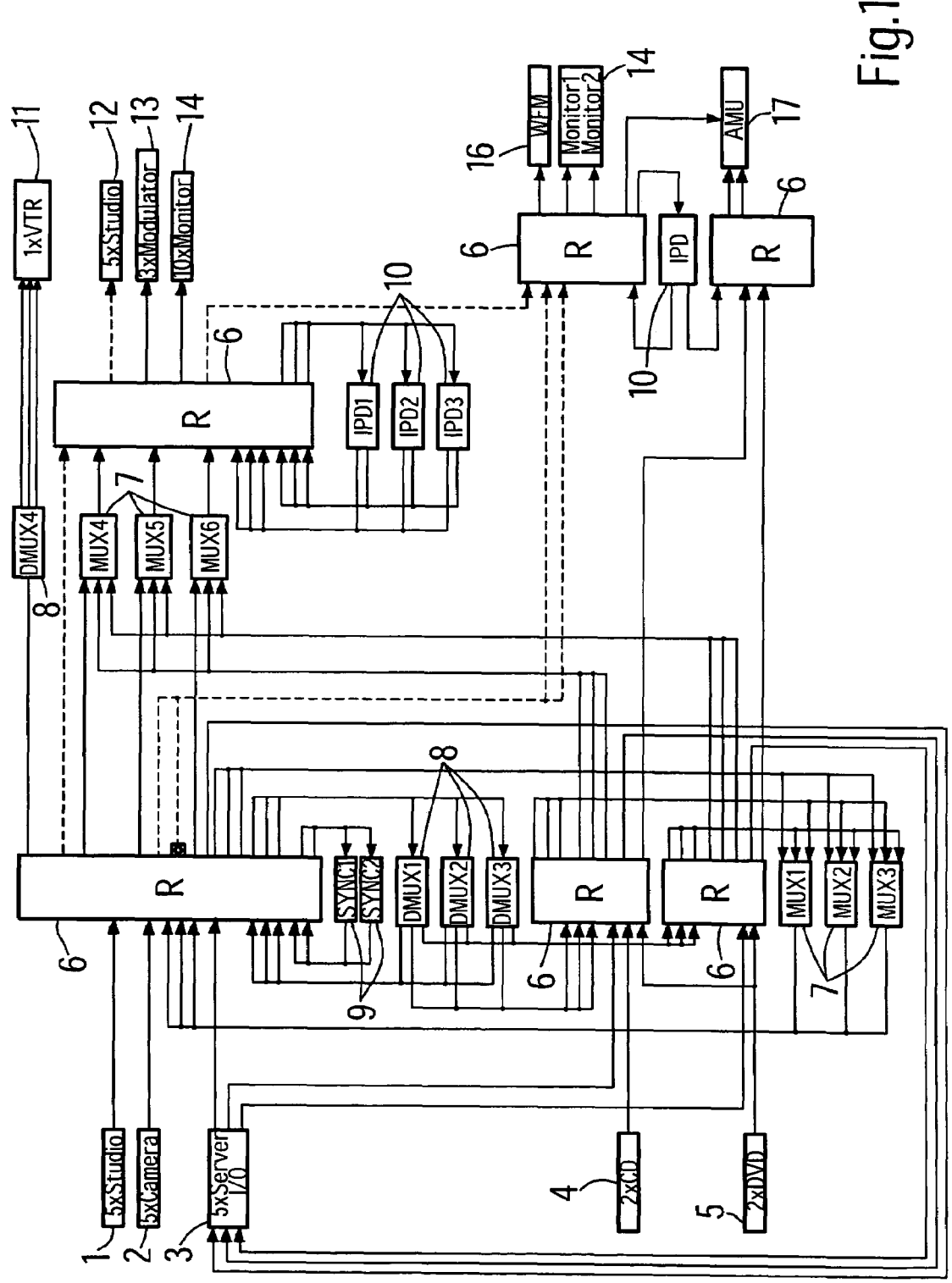
FIG. 1 shows a schematic block diagram of a television studio.

FIG. 1 represents a schematic block diagram of a television studio. The components shown form one example of a device for the distribution and processing of video signals, in which the method according to the invention can be employed. A series of different signal sources are illustrated on the left-hand side of FIG. 1. They include five studio signal sources 1, five cameras 2, five servers 3 as reproduction apparatuses, two CD players 4 and two DVD players 5. The input signals are fed to crossbars 6, so-called routers. The outputs of the crossbars are connected to multiplexers 7 and demultiplexers 8 in order to split and combine the signals. Furthermore, synchronization circuits 9 are provided in order to synchronize the signals originating from different sources. Furthermore, video decoders 10 are provided, so-called "integrated program decoders", which decode and demultiplex a video signal.

The outputs of the arrangement are represented on the right-hand side in FIG. 1. The video output signals are output to a recording apparatus 11, studio channels 12, modulators 13, and monitors 14. Furthermore, the output signals are monitored by means of measuring apparatuses, which include a "waveform monitor" 16 and an "audio monitoring unit" 17.

The block diagram of the studio has been described only cursorily because the device described is known in the prior art. The function blocks represented schematically are commercially available from Thomson, for example. Crossbars are sold by Thomson under the product designation "Trinix" and "Venus". Multiplexers and demultiplexers are offered by Thomson in the "Kameleon" product series. Converters which convert one given format of a video signal into another are available from Thomson under the designation "Serie 8900". Apparatuses of this type are also generally referred to as "signal devices". The numerous components of the entire device are linked to a central control unit via command lines, which is not shown in FIG. 1. The control unit is equipped with a display device, on which the current status of the device is represented. Furthermore, the display device serves to support the operator in the event of configuration changes to the device, by displaying individual method steps of the control method according to the invention. A number of essential method steps will be explained in more detail below with reference to FIGS. 2 to 4.

According to the method according to the invention, incoming video signals are analyzed with regard to their properties, or are fixedly predefined and are represented on the display with an input symbol. In this case, input symbols assigned to input signals with common properties are combined into groups. FIG. 2a shows that the input symbols within a group are represented by hue shades of a color, which is reproduced only incompletely by means of different gray shades in FIG. 2a. The group symbols 21, 22, 23 are displayed in red, green and blue, respectively, in one exemplary embodiment of the invention. The hue of the input symbols 21a, ..., 21c; 22a, ..., 22c; 23a, ..., 23c assigned to the individual groups becomes lighter from top to bottom in FIG. 2a.

FIG. 2b illustrates a different approach for representing the association of input symbols with respect to a group. In the case of this exemplary embodiment of the invention, graphical properties of the input symbols serve to illustrate the group association. Quadrangles and triangles are shown in FIG. 2b. However, other quadrangles and also circles, ellipses, etc. are also suitable for representation purposes.

Figure 3A:
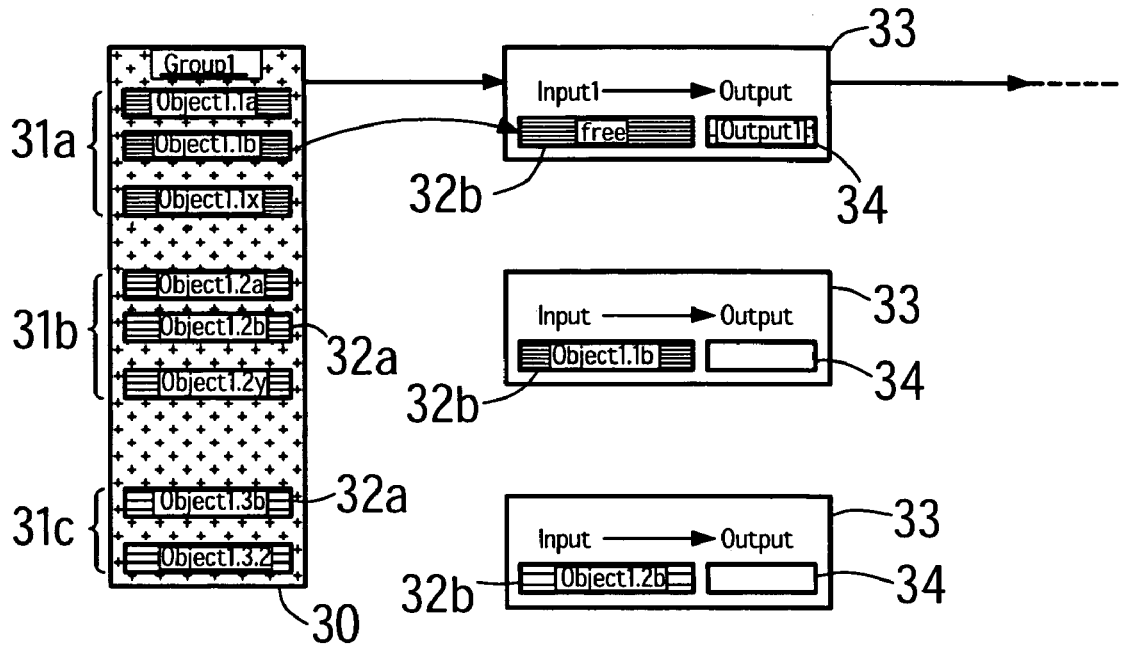
FIGS. 3a and 3b show the assignment of objects from a common input signal group to different output channels.

FIG. 3a represents the method with regard to how selectable input signals from an input signal group 30 are assigned to a specific output. The input signal group 30 is structured in three subgroups 31a, 31b and 31c, each comprising a number of input symbols 32a. In FIG. 3a, each subgroup contains two or three input symbols 32a. However, this number may be smaller or larger in other exemplary embodiments.

For the purpose of assignment to a specific output, an input symbol 32a is "deposited" in an assignment field 33, as is known from computer technology under the designation "drag and drop". The input symbol deposited into the assigned field 33 is designated by the reference symbol 32b in FIG. 3a. At the machine level, this step has the effect of switching the crossbars in such a way that the selected input signal is switched to the desired output. The desired output is in each case chosen by the operator by means of an output symbol 34 in the assignment field 33.

FIG. 3a represents the case where all the input signals or input symbols 32a can be assigned with restriction to association with respect to the input signal group 30. This freedom with regard to the configuration of the device is displayed to the operator by virtue of the fact that, in the assignment field 33, an as yet unoccupied input symbol 32b assumes the group color of the input signal group 30. In FIG. 3a, an input symbol 32b which is as yet unoccupied in the assignment frame 33 is additionally designated by the designation "free". Only when a specific input signal or input symbol 32a is deposited in an assignment field does the input symbol 32b assume the corresponding color. The different colors or hues are again indicated by various gray shades.

Figure 3B:
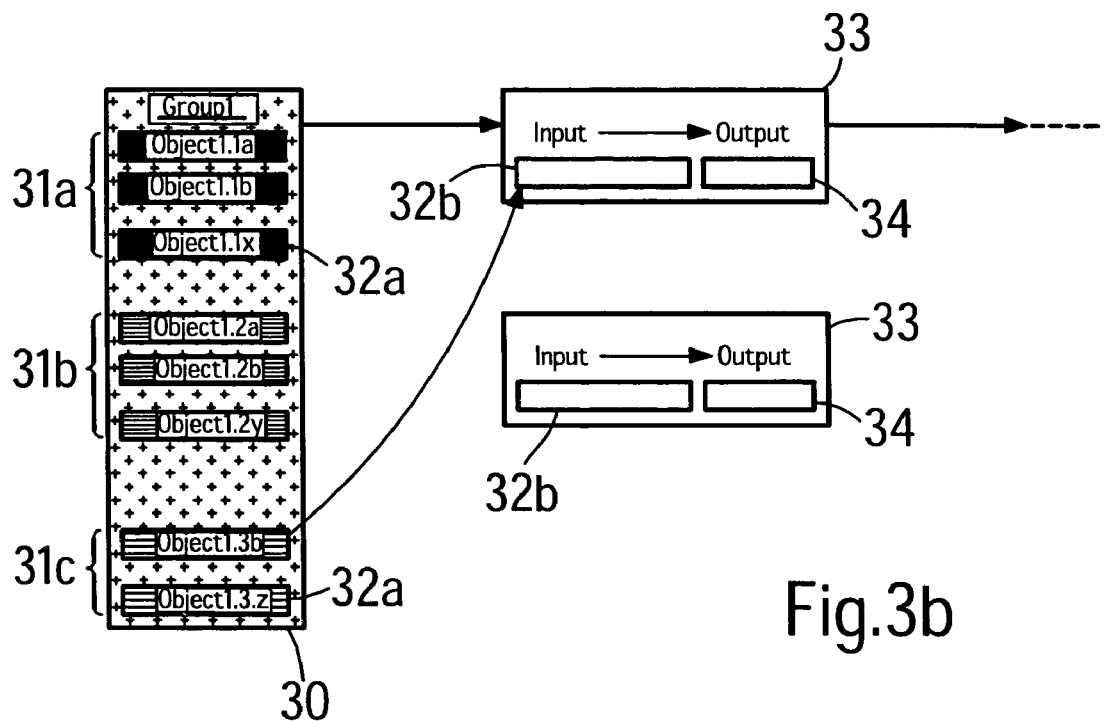

In contrast to FIG. 3a, FIG. 3b represents the case where only those input symbols 32a which belong to a specific subgroup of the input signal group 30 can be deposited in an assignment frame 33. This limitation with regard to the configuration of the device is displayed to the operator by virtue of the fact that, in the assignment field 33, an as yet unoccupied input symbol 32b assumes the color or the hue of the relevant subgroup. In FIG. 3b, too, an input symbol 32b which is as yet unoccupied in the assignment frame 33 is additionally designated by the designation "free".

The same relationships prevail between the output symbols and the output signals of the device as between the input symbols and the input signals. This means that output symbols illustrate the properties of the output signals in the same way as the input symbols illustrate the properties of the input signals.

At the machine level, the selection of a specific output symbol 34 has the effect that, if appropriate, signal converters are additionally switched into the signal path produced by the crossbars 6 in order to convert the signal format of the input signal into the desired signal format of the output signal. A particular advantage of the method according to the invention is that the operator is largely freed of monitoring and control tasks at the machine level and can concentrate on the creative aspect of his work.

In one development of the invention, the advantage mentioned is further supported by the fact that the depositing of input or output symbols of mutually incompatible signal types is blocked. This means that the operator cannot make any errors in this regard, which additionally makes his work easier. For this purpose, the possibilities for the conversion of signal formats are stored in a memory of the control unit in the manner of a table. If an operator attempts to perform an impermissible signal format conversion, i.e. a signal format conversion which is not entered in said table, then the desired assignment of the relevant input symbol to the relevant output symbol is blocked on the display. At the machine level, no functions are initiated. The "blocking" of the assignment can be effected in different ways, the concrete embodiment not being essential to the invention. In one exemplary embodiment of the invention, it is provided that an input or output symbol which is deposited in an assignment field 33 in order to perform an impermissible signal format conversion jumps back to its original location again. One modification of the invention provides for the relevant symbol to flash. In developments of the invention, warning indications are also displayed to the operator.

Besides the permissibility of a desired signal format conversion, the invention at the same time monitors whether the apparatus resources required for the desired action are actually available. It is conceivable, for example, that a required signal converter is already utilized to full capacity with other operations. In this case, the method according to the invention initiates the same blocking or warning functions as in the case of an impermissible signal format conversion.

Figure 4A:
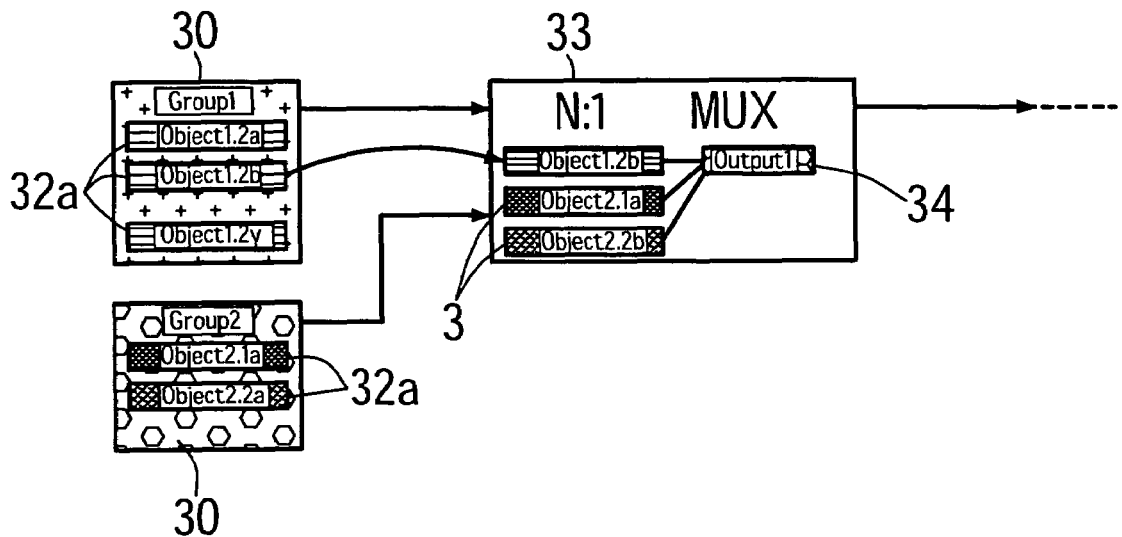
FIG. 4a shows the assignment of a plurality of signal sources to a single output channel.

FIG. 4a illustrates the method explained in connection with FIGS. 3a and 3b in an application on a multiplexer. A plurality of input signals are assigned to a single output channel.

Figure 4B:
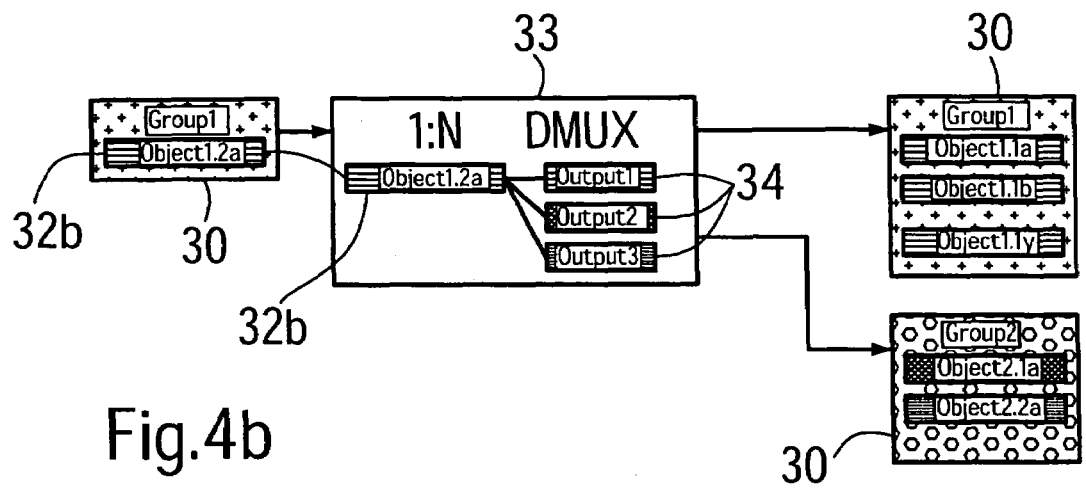
FIG. 4b shows the assignment of a single signal source to a plurality of output channels.

In a completely corresponding manner, FIG. 4b illustrates the application of the method according to the invention to a demultiplexer. One input symbol is assigned to a plurality of output symbols. In both cases, the plurality of input or output signals may perfectly well have different formats, too. In this case, at the machine level, the required signal converters are automatically switched into the signal paths.

In the description, the terms "output" and "output channel" are used additionally to one another and designate physical connections at which the device makes an output signal available.

What is claimed is:

1. A method for controlling a device for the distribution and processing of video signals, the device having a number of inputs and outputs and also signal processing stages which can optionally be switched into the signal paths for the processing of the input signals, the method comprising the following steps:
   (a) representing input signals on a display with input symbols;
   (b) assigning input signals with common properties to input symbols which have a common color property and/or graphical property;
   (c) assigning an output of the device to an output symbol, which represents the desired properties of the output signal in the same way as the input symbols represent the properties of the input signals;
   (d) assigning an output symbol to an input symbol, whereupon the relevant input is connected to a corresponding relevant output.

2. The method as claimed in claim 1, wherein the input signals have predefined properties and the input symbols are assigned in a manner dependent on the predefined properties of the input signals.

3. The method as claimed in claim 1, wherein the input signals are analyzed with regard to their properties and the input symbols are assigned in a manner dependent on the ascertained properties of the input signals.

4. The method as claimed in claim 1, wherein the properties of the input signals are structured in groups and the assigned symbols are reflected by visual commonalities.

5. The method as claimed in claim 1, wherein the properties of the output signals are structured in groups and the assigned symbols are reflected by visual commonalities.

6. The method as claimed in claim 1, wherein the properties of the input and output signals are structured in groups and the assigned symbols are reflected by visual commonalities.

7. The method as claimed in claim 1, wherein signal processing stages are switched into the signal path in order to convert the properties of the input signal into the properties of the output signal.

8. The method as claimed in claim 1, wherein the connection of the signal path between an input and an output is effected by the actuation of a crossbar.

9. The method as claimed in claim 7, wherein the conversion of the properties of input signals is effected by the actuation of signal converters.

10. The method as claimed in claim 7, wherein the connection of the signal path between an input and an output is effected by the confirmation of a multiplexer.

11. The method as claimed in claim 7, wherein the connection of the signal path between an input and an output is effected by the confirmation of a demultiplexer.

12. The method as claimed in claim 5, wherein the connection of the signal path between an input and an output is effected by the confirmation of one of a multiplexer and of a demultiplexer.

13. The method as claimed in claim 7, wherein a check is made to determine whether the properties of an input signal can be converted into the desired properties of an output signal, and if that is not possible, the assignment of the relevant input symbol to the relevant output symbol is not permitted.

14. The method as claimed in claim 7, wherein a check is made to determine whether the device is able to perform the desired signal conversion.

15. The method as claimed in claim 13, wherein a check is made to determine whether the device is able to perform the desired signal conversion.

* * * * *

UNITED STATES PATENT AND TRADEMARK OFFICE
CERTIFICATE OF CORRECTION

PATENT NO. : 7,573,536 B2
APPLICATION NO. : 10/805717
DATED : August 11, 2009
INVENTOR(S) : Arnd Paulsen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1298 days.

Signed and Sealed this

Seventh Day of September, 2010

David J. Kappos
*Director of the United States Patent and Trademark Office*